United States Patent [19]

Schultz et al.

[11] 4,260,638

[45] Apr. 7, 1981

[54] METHOD OF PEELING FRUITS AND VEGETABLES WITH CARBOXYLIC ACIDS

[75] Inventors: William G. Schultz; Harry J. Neumann, both of El Cerrito; John E. Schade, Walnut Creek, all of Calif.

[73] Assignee: The United States of America as represented by the Secretary of Agriculture, Washington, D.C.

[21] Appl. No.: 103,253

[22] Filed: Dec. 13, 1979

Related U.S. Application Data

[63] Continuation of Ser. No. 714,229, Aug. 13, 1976, abandoned.

[51] Int. Cl.³ ............................................. A23L 1/212
[52] U.S. Cl. ..................................... 426/287; 426/483
[58] Field of Search ............... 426/287, 288, 615, 482, 426/483

[56] References Cited

U.S. PATENT DOCUMENTS

| | | | |
|---|---|---|---|
| 2,273,183 | 2/1942 | Edes | 426/288 |
| 3,307,601 | 3/1967 | Aepli | 426/287 |
| 3,873,743 | 3/1975 | Aepli | 426/288 |

*Primary Examiner*—Hiram Bernstein
*Attorney, Agent, or Firm*—M. Howard Silverstein; David G. McConnell; Theodore J. Leitereg

[57] ABSTRACT

Novel process for peeling fruits and vegetables which yields maximum skin removal coupled with minimum loss of flesh. The fruit or vegetable is contacted with an aqueous dispersion of a 3–18 carbon carboxylic acid at elevated temperatures for a time sufficient to loosen the peel, which can then be removed by mechanical action.

15 Claims, No Drawings

METHOD OF PEELING FRUITS AND VEGETABLES WITH CARBOXYLIC ACIDS

This is a continuation of application Ser. No. 714,229, filed Aug. 13, 1976, now abandoned.

BACKGROUND OF THE INVENTION

1. Field of the Invention

The invention relates to and has among its objects the provision of novel processes for peeling fruits and vegetables. Further objects of the invention will be evident from the following description wherein parts and percentages are by weight unless otherwise specified.

2. Description of the Prior Art

In conventional practice in food processing plants, many fruits and vegetables are peeled by dipping them in hot lye (NaOH) solution, and then removing the loosened skin by wiping with rotating, soft rubber discs, or by flushing with jets of water. Although such lye-peelng procedure is effective, it presents several disadvantages. In the first place, high peeling losses occur because the caustic removes a substantial proportion of the softer tissue in the flesh of the fruit or vegetable as well as the peel. It is evident that high peeling losses are economically undesirable. Also, the peeled products do not have an attractive appearance because of removal of some of the flesh. This is, of course, a disadvantage where the product is intended for canning in the whole state. Another disadvantage of lye-peeling is that it yields a waste having a high NaOH content so that it is difficult to dispose of; many communities require that the waste be neutralized prior to releasing it into sewage plants, and even such neutralization, which is a considerable expense, does not alter the detrimental effect of its high sodium content.

To increase peeling efficiency in the lye-peeling method, various surfactants are added to the caustic peeling solution. For example, minor amounts of sodium 2-ethylhexylsulfate, sodium mono- and dinaphthalene sulfonates, or certain aliphatic acids have been used in conjunction with lye to peel fruits and vegetables. However, although peeling efficiency is increased, the use of caustic solutions containing surfactants is still subject to the same disadvantages as outlined above for caustic alone.

Peeling of fruits and vegetables is also accomplished using hot water, steam, or simple abrasion. These methods also have the disadvantage of high peeling losses, i.e., loss of valuable flesh, and uneven peeling.

SUMMARY OF THE INVENTION

The invention described herein provides means for obviating the problems outlined above. In the instant process fruits and vegetables are peeled by applying thereto a 0.1 to 20% aqueous dispersion of a carboxylic acid at a temperature of about 70° to 210° F. for a period long enough to loosen the peel. Then, the so-loosened peel is removed mechanically from the flesh of the fruit or vegetable.

The primary advantage of the invention is that the peel of the fruit or vegetable can be removed without removal of or damage to the flesh. Obviously, this is an economic advantage since the flesh is the salable commodity. Furthermore, an attractive appearance for the whole fruit or vegetable is retained, thus maintaining or increasing the marketability of the peeled material.

Another advantage of the invention is that the carboxylic acids employed are biodegradable. Consequently, disposal of spent peeling solutions is not a serious problem. The peeling solutions are compatible with municipal waste treatment facilities and agricultural land disposal systems. Also, the waste can be dried and used directly as an animal feed or as a fertilizer without prior neutralization and the like.

A further advantage of the invention is that lower temperatures may be employed as compared to peeling with lye, hot water, steam, etc. Consequently, less energy is consumed, thus making the instant process more economical. Further, lower peeling temperatures result in a better quality fruit or vegetable. Various desirable nutritional and physical attributes, such as color, cell structure, protein, pectin, and vitamin content, etc., are retained.

The peeling dispersion of the invention is not caustic or alkaline. Thus, another advantage of the invention is that lysinoalanine formation is avoided. Lysinoalanine is a substance recently suspected to be carcinogenic; it is formed when proteins are treated with alkali. In alkaline peeling of fruits and vegetables, then, some lysinoalanine is formed. The instant invention avoids this problem because the peeling medium is acidic.

A further advantage is that the peeling solutions are safer to handle. Hot alkaline solutions used in other peeling methods are extremely caustic and, therefore, dangerous to personnel and equipment.

DESCRIPTION OF THE PREFERRED EMBODIMENTS

In the following description emphasis is placed on the peeling of tomatoes. This emphasis is by way of illustration and not limitation. The invention has wide applicability and can be employed to remove the skin from any edible plant product such as fruits, including pears, apples, peaches, figs, grapefruit segments, etc., and vegetables, including tomatoes, potatoes (both sweet and white), carrots, beets, parsnips, turnips, pimentos, onions, squash, etc.

The term "dispersion" used herein includes dispersions, solutions, emulsions, suspensions, mixtures, and the like.

In a practice of the invention the tomatoes are contacted with a dilute aqueous dispersion of carboxylic acid. This is best done by immersing the tomatoes in the acid dispersion. Alternatively, the acid dispersion may be applied by spraying, brushing, or the like. Generally, the dispersion will contain about 0.1 to 20% of the acid and is kept hot, i.e., about 70° to 210° F., preferably, about 140°-150° F. It should be noted that the tomatoes can be efficiently peeled using a peeling dispersion containing water and a minor proportion of carboxylic acid as the sole peel-loosening agent—no caustic or alkaline material is necessary. Contact between the tomatoes and the fatty acid dispersion should be maintained for a period long enough to loosen the peel of the tomato. The amount of time is dependent on a number of factors, such as type and maturity of the tomatoes, the concentration of aliphatic acid in the solution, the temperature of the peeling bath, etc. Usually, the peel can be loosened by contacting the tomatoes with the peeling bath for about 0.1 to 10 minutes. It should be obvious that neither the concentration of acid, nor the temperature of the bath, nor the duration of contact should be great enough to cause damage to the tomato flesh.

Acids which may be used in the process of the invention include 2-18 carbon carboxylic acids such as ethanoic (acetic) acid, propanoic acid, butanoic (butyric) acid, pentanoic acid, hexanoic (caproic) acid, heptanoic acid, octanoic (caprylic) acid, nonanoic acid, decanoic (capric) acid, undecanoic acid, dodecanoic (lauric) acid, tridecanoic acid, tetradecanoic (myristic) acid, pentadecanoic acid, hexadecanoic (palmitic) acid, heptadecanoic acid, octadecanoic (stearic) acid, benzoic acid, 10 undecenoic acid, cis-9-octadecenoic (oleic) acid, cis, cis-9,12-octadecadienoic (linoleic) acid, cis, cis, cis-9,12,15-octadecatrienoic (linolenic) acid. Preferred for purposes of the invention are the even numbered 2-12 carbon aliphatic acids. It is also within the purview of the invention to employ 2 to 18 carbon polycarboxylic acids, i.e., those with more than one carboxylic acid function, to loosen the tomato peel. It should be noted that the peeling bath of the invention may contain only one of the above acids or mixtures of two or more of the aforementioned acids. Furthermore, it is not meant to limit the invention merely to the above-named acids; the above examples are merely representative.

Some of the carboxylic acids mentioned above, although effective in loosening the peel, possess an unpleasant odor. Consequently, such acids should be avoided where aroma of the peeled product is important. However, undesirable odors from the acid may be removed by contacting the tomatoes, either before or after removal of the loosened peel, with dilute aqueous carbonate or bicarbonate. Other means for avoiding undesirable aroma in the peeled products will be obvious to those skilled in the art.

After the peel of the tomato is loosened by application of a carboxylic acid dispersion, the tomato is treated to mechanically remove the so-loosened peel. Excellent results are obtained using a rubber-disc peeler as described in U.S. Pat. No. 3,618,651. Other means for removing the loosened peel, such as dry-brushing, water spraying, etc., will be suggested to those skilled in the art.

EXAMPLES

The invention is further demonstrated by the following illustrative examples.

EXAMPLE 1

Peeling of Tomatoes

A batch of tomatoes (Tropic variety grown in Sinoloa, Mexico) was divided into several lots, each lot being treated as follows:

Lot A: The tomatoes were weighed and then immersed in a 1% aqueous solution of octanoic acid at 150° F. for one minute to loosen the peel. The tomatoes were removed from the solution, and the loosened peel was removed by means of a rubber disc peeler as described in U.S. Pat. No. 3,618,651. The so treated tomatoes were weighed and the difference in weight was designated as the peel loss (4.8%). The peeled tomatoes had a smooth surface with a uniform red color resulting from the fact that the entire deep red sub-cuticular layer was undisturbed. In essence, the peel of the tomato was removed without loss of valuable tomato flesh.

Lot B: The tomatoes were weighed and then immersed in an aqueous mixture containing 11% sodium hydroxide and 0.2% sodium 2-ethylhexyl sulfate (SES) at 210° F. for 0.5 min. (commercial peeling process). The tomatoes were separated from the solution and the peel was removed as described above for Lot A. The peel loss was 12.4%. Peeling was not uniform, small amounts of peel adhered to the tomato. Furthermore, the flesh of the tomato was removed on parts of the tomato surface. The white vascular tissue was much more prominent than in the peeled Lot A tomatoes.

Lot C: The procedure described for Lot B was repeated except that 0.2% of Faspeel (a commercial aliphatic acid mixture produced by BASF Wyandotte Corporation) was used in place of sodium 2-ethylhexyl sulfate.

The peeling loss was 11.7%. As in Lot B, the peeled Lot C tomatoes had an uneven surface with peel adhering to part of the surface and flesh removed from part of the surface.

Lot D: The tomatoes were weighed and immersed in hot (212° F.) water for 1.0 minute. The tomatoes were then removed from the water and cooled. The peel was intact and was not removed when subjected to the action of the rubber discs.

Lot E: The procedure described above for Lot D was repeated except that the tomatoes were immersed for 1.5 minutes.

The so-treated tomatoes were overcooked and the surfaces had begun to crack.

Lot F: The procedure described above for Lot D was repeated except that the tomatoes were immersed for 2.0 minutes.

The so-treated tomatoes were overcooked and exhibited pronounced surface cracking and splitting.

The extent of peeling was rated as total (complete removal of peel) or partial (incomplete removal of peel). The appearance was rated as excellent, good, fair, or poor, depending upon the amount of flesh removed by the treatment. A rating of excellent meant that no flesh was removed, whereas a rating of poor indicated substantial removal of flesh or, in the case of the hot water treatments, substantial splitting of the tomato surface.

The results are summarized below.

| Lot | Peeling medium | Temp. (°F.) | Time (min.) | Peeling loss (%) | Extent of peeling | Appearance |
|---|---|---|---|---|---|---|
| A | 1% Octanoic acid | 150 | 1 | 4.8 | Total | Excellent |
| B[1] | 11% NaOH + 0.2% SES | 210 | 0.5 | 12.4 | Total | Poor |
| C[1] | 11% NaOH + 0.2% Faspeel | 210 | 0.5 | 11.7 | Total | Poor |
| D[2] | Water | 212 | 1.0 | Unpeeled | None | — |
| E[2] | Water | 212 | 1.5 | " | None | Poor (tomato cooked) |
| F[2] | Water | 212 | 2.0 | " | None | Poor (tomato cooked) |

[1] Not in accordance with the invention but provided for purposes of comparison; both peeling media are used commercially.
[2] Not in accordance with the invention but provided for purposes of comparison; generally used to peel tomatoes on a small scale such as in the home. The fact that peeling did not take place indicates the difficulty of peeling this particular variety of tomato.

EXAMPLE 2

Peeling of Tomatoes

A batch of tomatoes (same variety as in Example 1) was divided into several lots and each lot was treated in accordance with the procedure outlined in Example 1, Lot A, with changes as indicated in the table below.

| Lot | Peeling medium | Temperature (°F.) | Time (min.) | Peeling loss (%) | Extent of peeling | Appearance |
|---|---|---|---|---|---|---|
| G | 1% Hexanoic acid | 120 | 2.5 | 5.5 | Total | Excellent |
| H | " | 120 | 5 | 7.9 | Total | Excellent |
| J | " | 80 | 51 | 12.7 | Total | Good |
| K | 1% Butyric | 150 | 1 | 5.2 | Total | Excellent |
| L | " | 120 | 5 | 5.4 | Total | Good |
| M | 10% Acetic acid | 150 | 2 | 7.5 | Total | Good |
| N | 5% Acetic acid | 150 | 2 | 2.6 | Partial | Poor |
| P | 1% Oleic acid | 150 | 1 | 1.0 | Partial | Poor |
| R[1] | 11% NaOH + 0.2% SES | 210 | 0.5 | 12.4 | Total | Poor |

[1]Not in accordance with the invention but provided for purposes of comparison; the peeling medium is used commercially.

It should be noted that the odor of the peeled product may be undesirable due to the presence of trace amounts of the carboxylic acid employed in the peeling process. In addition, in the case of those carboxylic acids which are solid at ambient temperature, an undesirable residue may be left on the peeled material. In both cases, these undesirable effects were removed by washing the peeled product in dilute aqueous sodium bicarbonate.

EXAMPLE 3

Peeling of Pears

Ripe Anjou pears were divided into lots and treated as follows:

Lot S: The pears were immersed in a 1% aqueous octanoic acid solution at 150° F. for 3 minutes to loosen the peel. The pears were removed from the solution, and the loosened peel was removed by means of a rubber disc peeler as described in Example 1. The peeled pears had a smooth surface resulting from the total removal of the peel without removal of the flesh.

Lot T: The pears were treated in accordance with the procedure described for Lot S but were immersed for 10 minutes in the peeling medium.

Lot U: These pears were immersed in water at 150° F. for 5 minutes, removed from the bath, and cooled.

The results are tabularized below.

| Lot | Peeling medium | Temperature (°F.) | Time (min.) | Extent of peeling | Appearance |
|---|---|---|---|---|---|
| S | 1% Octanoic acid | 150 | 3 | Total | Good |
| T | " | 150 | 10 | Total | Poor |
| U[1] | Water | 150 | 5 | None | Poor |

[1]Not in accordance with the invention but provided for comparison.

EXAMPLE 4

Peeling of Carrots

Ripe carrots were divided into lots and treated as follows:

Lot V: Treated in the same manner as described for the pears in Lot T of Example 3.

Lot W: Treated in the same manner as the pears of Lot U in Example 3 except that the immersion time was 30 minutes.

The results are summarized in the following table:

| Lot | Peeling medium | Temperature (°F.) | Time (min.) | Extent of peeling | Appearance |
|---|---|---|---|---|---|
| V | 1% Octanoic acid | 150 | 10 | Partial | Poor |
| W[1] | Water | 150 | 30 | None | Poor |

[1]Not in accordance with the invention but provided for comparison.

Having thus described our invention, we claim:

1. A process for preparing edible plant products to be peeled and peeling edible plant products, which consists essentially of
   (a) contacting the unpeeled edible plant product with an aqueous dispersion containing a 2-18 carbon carboxylic acid as the sole pretreatment and peel-loosening agent in a concentration and for a period of time and at a temperature sufficient to loosen the peel, and
   (b) mechanically removing the so-loosened peel.
2. The process of claim 1 wherein the concentration of the carboxylic acid is about from 0.1 to 20%.
3. The process of claim 1 wherein the carboxylic acid contains 4 to 12 carbons.
4. The process of claim 1 wherein the period of contact is from about 0.1 to 10 minutes.
5. The process of claim 1 wherein the temperature of the aqueous dispersion is about from 70° to 210° F.
6. The process of claim 1 wherein the carboxylic acid is octanoic acid.
7. The process of claim 1 wherein the carboxylic acid is hexanoic acid.
8. The process of claim 1 wherein the carboxylic acid is butyric acid.
9. The process of claim 1 wherein the carboxylic acid is acetic acid.
10. The process of claim 1 wherein the carboxylic acid is oleic acid.
11. The process of claim 1 wherein the edible plant product is contacted with the aqueous dispersion by immersion therein.
12. The process of claim 1 wherein the edible plant product is selected from the group consisting of fruits and vegetables.
13. The process of claim 12 wherein the edible plant product is tomatoes.
14. The process of claim 12 wherein the edible plant product is pears.
15. The process of claim 12 wherein the edible plant product is carrots.

* * * * *